Jan. 19, 1960  D. A. SMITH  2,921,652
AUTOMATIC TRAILER BRAKE
Filed March 7, 1958  2 Sheets-Sheet 1

Donald A. Smith
INVENTOR.

BY *Clarence A.O'Brien
and Harvey B. Jacobson*
Attorneys

Jan. 19, 1960     D. A. SMITH     2,921,652
AUTOMATIC TRAILER BRAKE
Filed March 7, 1958     2 Sheets-Sheet 2
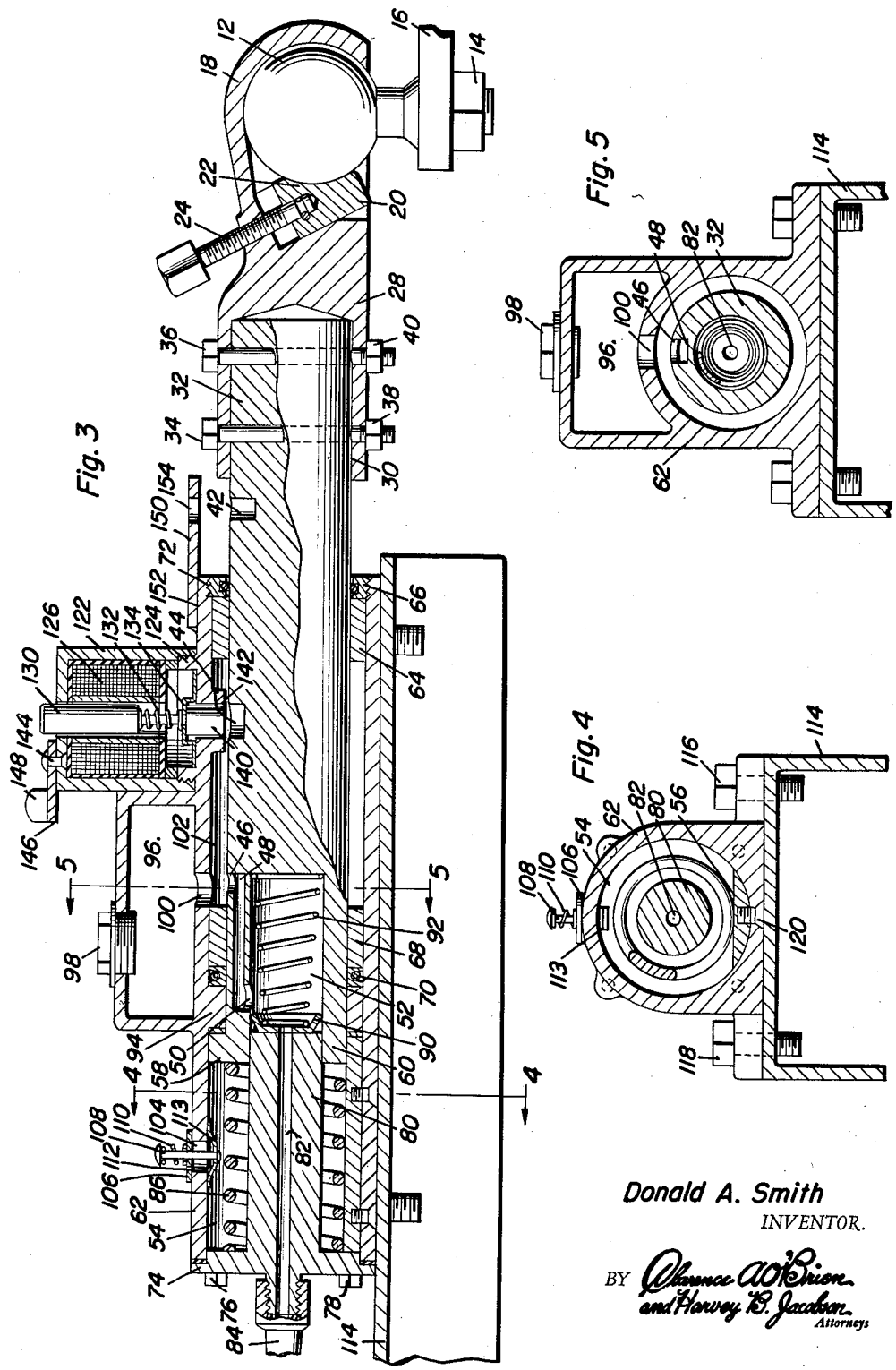
Donald A. Smith
INVENTOR.
BY *Clarence A. O'Brien*
and *Harvey B. Jacobson*
Attorneys United States Patent Office 2,921,652
Patented Jan. 19, 1960

2,921,652

AUTOMATIC TRAILER BRAKE

Donald A. Smith, Painesville, Ohio

Application March 7, 1958, Serial No. 719,815

6 Claims. (Cl. 188—112)

This invention relates generally to an automatic trailer brake and more particularly to a novel and improved master brake cylinder combined with a ball socket to connect to a standard ball of a regular trailer hitch.

It is a well known fact of physics that an object in motion will tend to remain in motion in the absence of retarding forces. It is for this very reason that a trailer which is being pulled by a self-propelled vehicle will tend to continue its forward motion and run into the self-propelled vehicle when the brakes of the self-propelled vehicle are applied and no braking action is applied to the wheels of the trailer. Of course, the linkage between the vehicle and the trailer could sustain a portion of the momentum force of the trailer bearing on the linkage but however this would subject the linkage to severe mechanical stresses which are clearly undesirable. In order to satisfactorily overcome this problem trailers may utilize a separate hydraulic system actuated by the brake pedal of the vehicle so as to apply a braking action to the trailer wheels simultaneously with the application of braking action to the vehicle wheels. This, conventionally requires the extension of a pair of hydraulic hoses between the vehicle and the trailer. These hoses are of course in addition to the normal hitch connection between the vehicle and trailer. These separate connecting means have clear disadvantages. That is, the separate hydraulic hoses are subject to failure and the separate connections necessarily require additional labor in establishing the hitched relationship. Therefore, it is the primary object of this invention to provide an automatic trailer brake which utilizes the forward momentum of the trailer relative to the forward momentum of the vehicle for actuating a trailer master brake cylinder for braking the individual trailer wheels upon deceleration of the towing vehicle.

It is a further object of this invention to provide a combination hitch and master brake cylinder to eliminate the need for two separate connections.

It is a still further object of this invention to provide a novel and improved trailer hitch which is efficient, reliable, and less expensive and more compact than heretofore known devices accomplishing the same end result.

It is a still further object of this invention to provide an automatic trailer brake which automatically eliminates the braking action when the towing vehicle is in reverse gear.

It is a still further object of this invention to provide an automatic trailer brake which incorporates a damping pressure release so as to provide smooth acceleration and deceleration.

In accordance with the above stated objects, below is described an automatically operated master brake cylinder for utilization with trailers towed by self-propelled vehicles comprising a shaft adapted to be pulled by the vehicle and a casing slidable on the shaft affixed to the trailer. The shaft includes a bore therein which slidably accommodates a piston carried by the casing. Spring means carried between the casing and the shaft bias the casing and shaft apart. A reservoir for containing brake fluid is carried by the casing and communicates with the bore. The bore in turn communicates through a passage in the piston with the individual trailer wheel brake cylinders. This structural relationship provides for a braking action on the trailer wheels when upon deceleration of the self-propelled vehicle, the trailer momentum carries the casing slidably forward over the shaft and forces the piston into the bore and the brake fluid through the piston passage under pressure to the individual trailer wheel brakes. The casing further carries a solenoid which is capable of actuating a plunger so as to move the plunger through an aperture in the casing and into a depression in the shaft so as to prevent any slidable movement between the shaft and the casing. The solenoid is placed in the back up light circuit of the self-propelled vehicle so that the master cylinder, comprising this invention, is rendered non-operative when the self-propelled vehicle is in reverse gear.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a sectional view taken substantially along the plane 3—3 of Figure 2;

Figure 4 is a sectional view taken substantially along the plane 4—4 of Figure 3;

Figure 5 is a sectional view taken substantially along the plane 5—5 of Figure 3.

Figure 1:
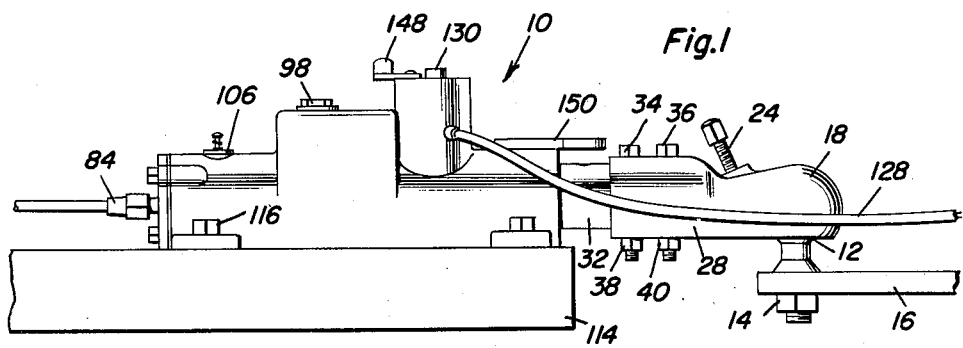
Figure 1 is an elevational side view indicating the relationship between the self-propelled vehicle and the trailer established by the hitch means of this invention.
Figure 2:
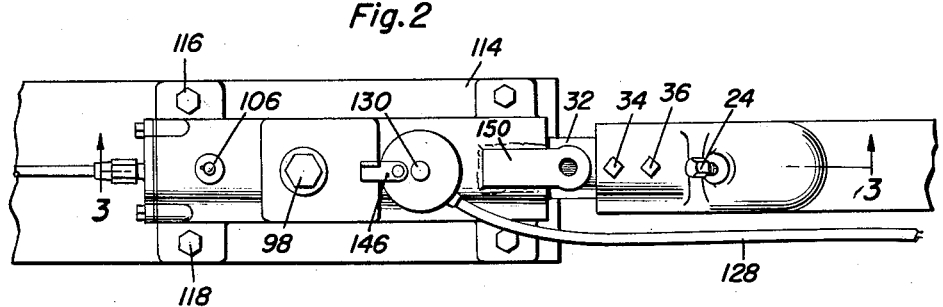
Figure 2 is an elevational plan view of the hitch means comprising this invention.

With continuing reference to the drawing and initial reference to Figure 1 numeral 10 generally represents the automatic trailer brake comprising this invention. Numeral 12 represents a ball fixedly secured by the nut 14 to a frame 16 connected to a self-propelled vehicle (not shown). The ball 12 is maintained in socket 18 and is secured therein by bearing body 20 which has a spherical recess 22 for accommodating a portion of the ball surface. The body 20 bears against the ball 12 and its pressure is regulated by a bolt 24 which is threadedly engaged with the body 20. The socket 18 has an extended portion 28 which contains an internal bore 30 therein which is particularly adapted to accommodate a shaft 32. A pair of bolts 34 and 36 pass through the extension 28 and shaft 32 and are engaged with a pair of nuts 38 and 40 for fixedly maintaining the shaft 32 in the bore 30. It should be apparent that shaft 32 is therefore connected to the frame 16 in such a manner that a force on the frame 16 by the self-propelled vehicle will cause a like force on the shaft 32.

The shaft 32 extends rearwardly and has a pair of depressions 42 and 44 therein for purposes to be more clearly described below. Rearwardly of the depression 44 is a port 46 which communicates with the chamber 48 having port 50 therein. The port 50 in turn communicates with a shaft bore 52. As will be most clearly noted in Figure 4, the spring chamber 54 has a substantially circular cross-sectional area but has a flattened bottom portion 56. The end portion of the shaft 32 is accommodated in this spring chamber and likewise has a cross-sectional area which is substantially circular at the top portion 58 but flattened at the bottom portion 60;

The above mentioned spring chamber 54 is defined by the walls of a casing 62. The casing 62 is slidably positioned on the shaft 32. The slidable elements defining the slidable relationships include bushings 64 and 68 which are enclosed by oil seals 66 and 70. The oil seal 66 is shown as being externally threaded as at 72 so as to be threadedly engaged with the casing 62.

The casing 62 has an end portion 74 which is affixed to the casing by bolts 76 and 78. The end portion 74 carries on it a piston 80 which is so located so as to be reciprocally movable within the bore 52 of the shaft 32. The piston 80 has a passage 82 running longitudinally therethrough. The passage 80 proceeds through individual hydraulic lines from 84 to individual wheel trailer brake cylinders. A heavy coil spring 86 is fitted around the piston 80 and extends between the end portion 74 of casing 62 and the end portion of shaft 32. The spring 86 biases the casing 62 and the shaft 32 apart. The piston 80 has a hydraulic cup 90 on the end thereof. The hydraulic cup 90 has an aperture therein which is aligned with the passage 82 through the piston 80. A light coil spring 92 extends between the cup and the end bore wall for centering the hydraulic cup 90 properly on the piston 80.

As noted above, the portion of the shaft 32 designated at 60 is flattened so as to prevent relative rotational movement between the casing 62 and the shaft 32. The top rounded portion 58 is adapted to abut a projection 94 on the inner surface of the casing 62. This abutting relationship between 58 and 94 allows for the transmission of a pulling force from the shaft 32 to the casing 62 when the shaft 32 is being pulled by the self-propelled vehicle.

On the top surface of the casing a reservoir 96 for holding a supply of brake fluid therein. A neck 98 communicates with the reservoir 96 for the purpose of supplying brake fluid to the reservoir 96. A port 100 is placed in the floor of the reservoir 96 and communicates with a chamber 102 which in turn communicates with the shaft bore 52 through the port 46, chamber 48, and port 50.

An aperture 104 is positioned in the casing communicating with the spring chamber 54 and is sealed by a valve portion 106 which is adapted to ride on the shaft 108. A spring 110 is carried between the head of the shaft 108 and the valve member 106 to bias the member 106 so as to seal the aperture 104 from the outside air. More particularly, the valve member 106 serves to normally allow substantially no communication between the outside air and the spring chamber 54. However, a small aperture 112 is included in the valve member 106 for allowing some communication between the spring chamber 54 and the outside air so as to slowly equalize pressure variations. The shaft 108 is maintained in position by a U-shaped support 113.

The casing 62 is affixed to the trailer tongue 114 by bolts as at 116 and 118. The flattened portion 56 of the spring chamber is maintained within the casing by countersunk screws 120.

An initial explanation of the operation of this device appears to now be in order. When a self-propelled vehicle (not shown) is pulling the ball 12, a pulling force is transmitted to the shaft 32 and likewise to the casing 62 through the abutting relationship between 58 and 94. When the brakes are applied in the self-propelled vehicle, the trailer will tend to stay in motion and have resulting momentum relative to the momentum of the self-propelled vehicle. This greater resulting momentum will be transmitted through the trailer tongue 114 and bolts 116 and 118 so as to carry the casing 62 slidably forward on the shaft 32. This forward sliding movement will project the piston 80 into the bore 52 against the spring pressure of spring 86. The bore 52 at all times contains brake fluid conveyed thereto from the reservoir 96 through the ports 100, 46, and 50. As the piston 80 passes the port 50 the brake fluid in the bore 52 will be forced under pressure through the passage 82 to the individual wheel trailer brake cylinders. The effect of this chain of events, is to have a braking force applied to the trailer wheels independently of though simultaneously with the brake pressure applied to the wheels of the self-propelled vehicle. It should be noticed that the port 46 is likewise blocked when the port 50 is blocked thus providing a tighter chamber for the brake fluid and the maximum pressure for the brake fluid flowing through the passage 82. The valve member 106 is provided to allow a quick release of air from the spring chamber 54 so as to allow a relatively rapid piston movement into the bore 52. Upon acceleration, after braking, of the self-propelled vehicle, the valve member 106 will close the aperture 104 so that the return of the piston 80 to the position shown in Figure 3 will be relatively slow in that the outside air pressure will prevent expansion of the spring 86 until the aperture 112 allows sufficient air to enter the spring chamber 54.

A housing 122 is threadedly engaged on a neck portion 124 carried by the casing 62. The housing 122 carries therein a solenoid coil 126 which is electrically connected by an electric cable 128 to the back up light system of the self-propelled vehicle so as to be actuated whenever the self-propelled vehicle is in reverse gear. The solenoid 126 is adapted to actuate a plunger 130 against the spring pressure of spring 132 which is carried between the plunger 130 and a portion of the casing 134. A second plunger portion 140 is slidably accommodated in a casing aperture 142 and is adapted to fit in the recess 44 of shaft 32 so as to prevent relative sliding movement between the shaft 32 and casing 62 when the self-propelled vehicle is in reverse gear and there is obviously no desire for the braking action caused by the differences in forward momentum. The housing 122 further carries a shaft 144 on its top surface. The shaft 144 rotatably supports a stop member 146 having a projection 148 thereon to facilitate manual movement. This top portion 146 is adapted to rotate about the shaft 144 so as to maintain the plunger 130 in the pressed position after the plunger 130 has been manually depressed. This feature enables the bottom plunger portion 140 to engage the recess 44 so that any relative sliding movement between the shaft 32 and casing 62 may be selectively eliminated when conditions are not such where automatic braking is desirable.

A projection 150 is welded to the casing 62 as at 152 and has an aperture 154 therethrough which is aligned with the recess 42 in the casing 32. This provided so that a lever may be utilized between the aperture 154 and the recess 42 for manually sliding the casing 62 relative to the shaft 32. This action is desired to manually bleed the wheel brake cylinders. That is, by this manual relative sliding movement the brake fluid in the bore 52 may be forced under pressure through the passage 82.

Figure 6:
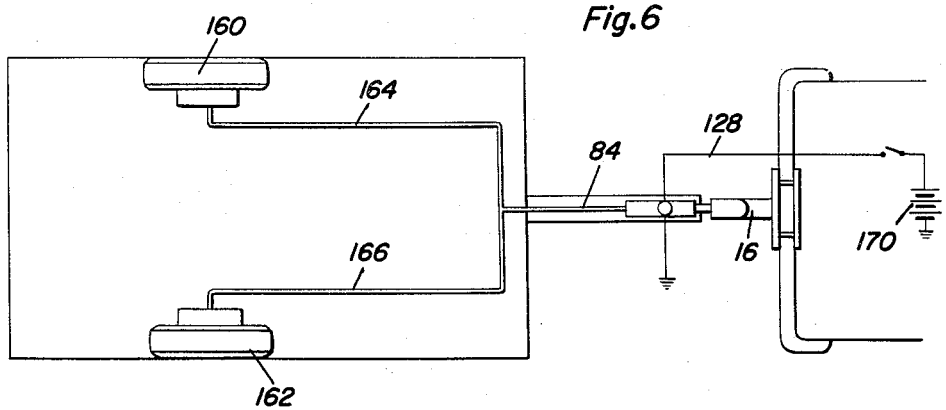
Figure 6 is an elevational plan view indicating the relationship between the self-propelled vehicle and the trailer.

Figure 6 illustrates schematically the device comprising this invention utilized with a forward vehicle and trailer having wheels 160 and 162 and having hydraulic lines 164 and 166 connected thereto respectively. The electric cable 128 is shown connected to an electric storafe battery 170 carried by the self-propelled vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An automatically operated master brake cylinder for utilization with trailers comprising a shaft adapted to be pulled by a self-propelled vehicle, a hollow cylindrical casing fixed to a trailer concentrically slidable on said shaft, a bore within said shaft, a piston affixed to said casing and slidable in said bore, said bore communicating with individual trailer brake cylinders, a spring means attached between said piston and said shaft in a spring chamber, said spring means biasing said piston out of said bore, a flange on the rear of said shaft extending into said spring chamber and abutting said casing, a fluid reservoir carried by said casing, said reservoir communicating with said bore, said reservoir bore communication being blocked by said piston when said piston enters said bore whereby fluid in said bore may be forced under pressure from said bore to said individual trailer brake cylinders.

2. An automatically operated master brake cylinder for utilization with trailers comprising a shaft adapted to be pulled by a self-propelled vehicle, a hollow cylindrical casing fixed to a trailer concentrically slidable on said shaft, a bore within said shaft, a piston affixed to said casing and slidable in said bore, said bore communicating with individual trailer brake cylinders, a spring means attached between said piston and said shaft in a spring chamber, said spring means biasing said piston out of said bore, a flange on the rear of said shaft extending into said spring chamber and abutting said casing, a fluid reservoir carried by said casing, said reservoir communicating with said bore, said reservoir bore communication being blocked by said piston when said piston enters said bore whereby fluid in said bore may be forced under pressure from said bore to said individual trailer brake cylinders, said brake cylinder bore communication including a fluid passage through said piston, said passage area being small relative to said piston area whereby a movement of said piston in said bore will force the bore fluid under pressure through said piston in a direction opposite to the piston travel.

3. An automatically operated master brake cylinder for utilization with trailers comprising a shaft adapted to be pulled by a self-propelled vehicle, a casing fixed to a trailer slidable on said shaft, a bore within said shaft, a piston affixed to said casing and slidable in said bore, said bore communicating with individual trailer brake cylinders, a spring means attached between said piston and said shaft in a spring chamber, said spring means biasing said piston out of said bore, a fluid reservoir carried by said casing, said reservoir communicating with said bore, said reservoir bore communication being blocked by said piston when said piston enters said bore whereby fluid in said bore may be forced under pressure from said bore to said individual trailer brake cylinders, said brake cylinder bore communication including a fluid passage through said piston, said passage area being small relative to said piston area whereby a movement of said piston in said bore will force the bore fluid under pressure through said piston in a direction opposite to the piston travel, valve means carried by said casing, said valve means located so as to communicate said spring chamber with the air surrounding said casing so as to allow an easy air escape from said chamber but to substantially impede an air entrance to said chamber.

4. The combination of claim 3 including cooperating means carried by said casing and shaft for manually sliding said casing on said shaft.

5. The combination of claim 3 including means for selectively preventing the slidable movement between said shaft and said casing.

6. An automatically operated master brake cylinder for utilization with trailers comprising a shaft adapted to be pulled by a self-propelled vehicle, a hollow cylindrical casing fixed to a trailer concentrically slidable on said shaft, a bore within said shaft, a piston affixed to said casing and slidable in said bore, said bore communicating with individual trailer brake cylinders, a spring means attached between said piston and said shaft in a spring chamber, said spring means biasing said piston out of said bore, a flange on the rear of said shaft extending into said spring chamber and abutting said casing, a fluid reservoir carried by said casing, said reservoir communicating with said bore, said reservoir bore communication being blocked by said piston when said piston enters said bore whereby fluid in said bore may be forced under pressure from said bore to said individual trailer brake cylinders, said spring chamber having a cross-section including an arcuate portion and a flat portion, said flange including an arcuate portion and a flat portion receivable in said spring chamber with said flat portions aligned to prevent relative rotation therebetween.

References Cited in the file of this patent
UNITED STATES PATENTS

| 2,158,175 | Coppola et al. | May 16, 1939 |
| 2,672,221 | Laudahl | Mar. 16, 1954 |
| 2,716,471 | Long | Aug. 30, 1955 |
| 2,834,437 | Davids | May 13, 1958 |